United States Patent [19]

Cavedo

[11] Patent Number: 5,036,926

[45] Date of Patent: Aug. 6, 1991

[54] POWER TOOL WITH IMPROVED BEARING BLOCK

[75] Inventor: Robert P. Cavedo, Easley, S.C.

[73] Assignee: Ryobi Motor Products Corp., Pickens, S.C.

[21] Appl. No.: 561,792

[22] Filed: Aug. 2, 1990

[51] Int. Cl.[5] .............................................. B23B 45/16

[52] U.S. Cl. ......................................... 173/104; 81/52

[58] Field of Search .................... 173/48, 109, 104, 47, 173/163, 12, 93, 93.5, 111; 81/467, 469, 470, 52

[56] References Cited

U.S. PATENT DOCUMENTS 3,835,715 9/1974 Howell ................................. 173/48

4,299,293 11/1981 Nikolaev ............................ 173/104

*Primary Examiner*—Timothy V. Eley

*Assistant Examiner*—Willmon Fridie, Jr.

*Attorney, Agent, or Firm*—David L. Davis

[57] ABSTRACT

A handheld portable electric drill having an improved self-aligning bearing block which has a semicircular configuration and is contained within a cavity in one half of a two part clamshell type housing for the drill. The bearing block has a cut out surface which conforms to the output spindle bushing, and a bearing hole for the intermediate gear shaft. For assembly, the bearing block is pressed into the cavity and when the other half of the housing is attached, rib surfaces thereon rotate the bearing block into appropriate positional alignment.

3 Claims, 3 Drawing Sheets

POWER TOOL WITH IMPROVED BEARING BLOCK

BACKGROUND OF THE INVENTION

This invention relates to portable power tools and, more particularly, to such a device with an improved self-aligning bearing block.

Portable power tools, such as for example, handheld electric drills, generally comprise a two part clamshell housing with an output spindle extending outwardly through a defined nose end of the housing. The output spindle is rotatively coupled, through an intermediate gear train, to a drive motor supported within the housing. If the output spindle and the shaft of the intermediate gear train are not properly aligned, this will cause excessive binding, wear and heat, resulting in damage to the tool. It is therefore a primary object of the present invention to provide an arrangement to maintain the output spindle and intermediate gear shaft of a power tool in proper alignment.

A prior design utilizes a bearing block that is held in place by a screw clamp. However, with this prior design, once the screw clamp is secured, no further adjustment is possible. It is therefore a further object of this invention to provide an arrangement which does not suffer from the disadvantages of the prior design.

SUMMARY OF THE INVENTION

The foregoing, and additional, objects are attained in accordance with the principles of this invention by providing a power tool having a two part clamshell type housing and a motor supported within the housing, the motor having an output shaft journalled in the housing. The housing has a defined nose end and a bushing is supported in the housing at the nose end. An output spindle of the tool extends through the bushing and the nose end of the housing and is rotatively coupled to the motor output shaft by intermediate gear means including a gear shaft. A bearing block having a surface conforming to an exterior surface of the bushing is supported in one of the housing parts with its conforming surface in engagement with the bushing exterior surface, the bearing block further having means for providing a bearing support for an end of the gear shaft of the intermediate gear means. The bearing block is held in a predetermined positional alignment by structure formed on the other housing part, this structure automatically aligning the bearing block when the two housing parts are assembled together.

BRIEF DESCRIPTION OF THE DRAWINGS

The foregoing will be more readily apparent upon reading the following description in conjunction with the drawings in which like elements in different figures thereof have the same reference numeral and wherein.

DETAILED DESCRIPTION

Figure 1:
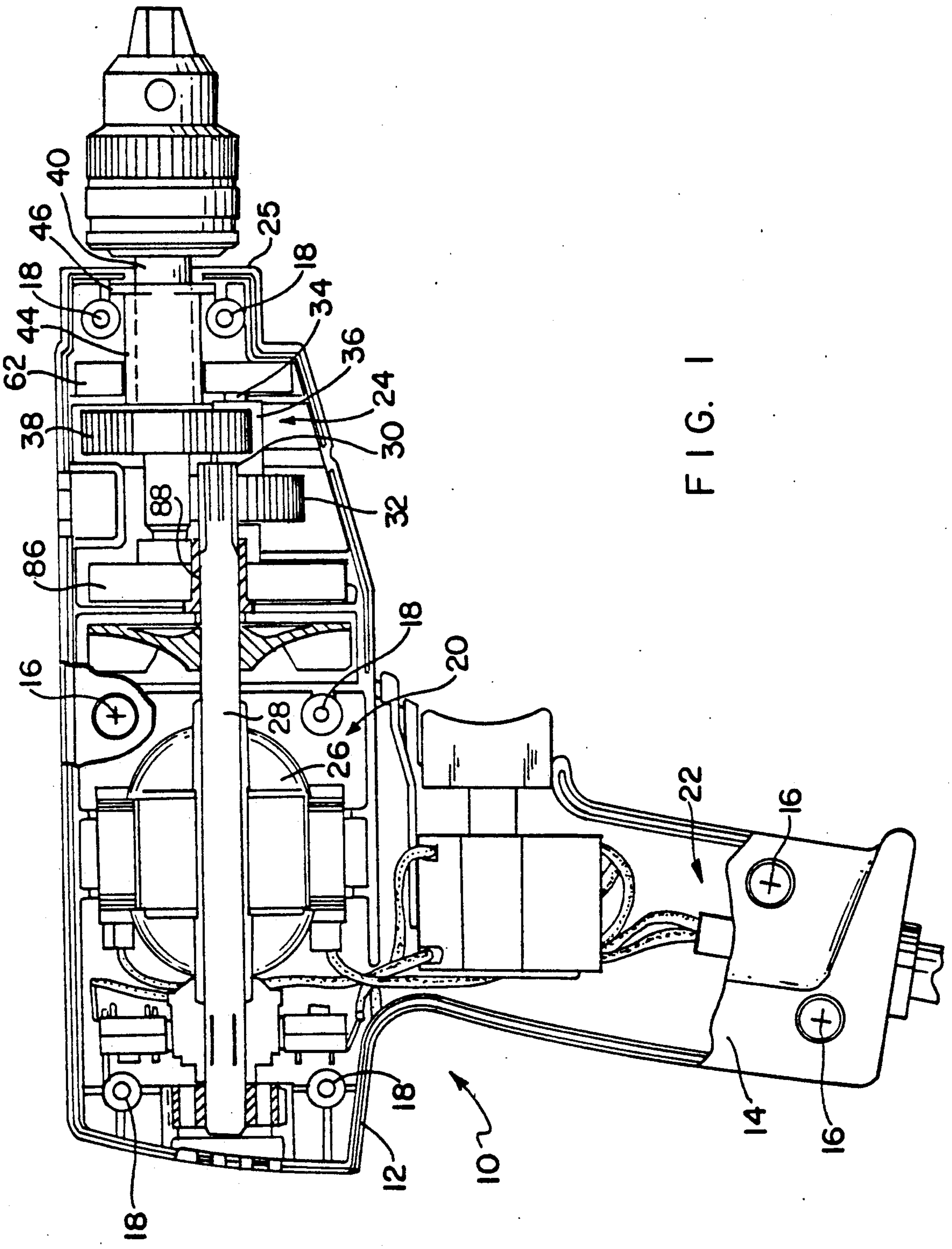
FIG. 1 is a partially sectioned side view showing a handheld portable electric drill incorporating structure according to the principles of this invention.

Referring to the drawings, there is shown a handheld portable electric drill, designated generally by the reference numeral 10, in which there is incorporated improved structure according to this invention. The drill 10 includes a housing which is formed of a first part 12 and a second part 14 secured together in clamshell fashion by screws 16 which pass through openings in the housing part 14 and threadedly engage aligned bores 18 in the housing part 12. The housing parts 12 and 14 are each formed with a motor mount section 20, a depending handle section 22 and a gear train section 24. As is conventional, each of the parts 12, 14 is generally concave with internal support ribs and when joined together meet along a plane, with the part 14 having a peripheral groove 15 and the part 12 having a projecting peripheral ridge 13 which extends into the peripheral groove 15. Thus, the joined parts 12, 14 together form a hollow housing for holding the parts of the drill. This housing has a defined nose end 25 at the end of the gear train section 24.

Supported within the motor mount section 20 is a motor 26 having a shaft 28 journalled in the housing in a conventional manner. The forward end of the motor shaft 28 is formed with a drive pinion 30 which engages gear 32 of an intermediate gear train. The gear 32 is mounted on intermediate gear shaft 34, which also has mounted thereon gear 36. The gear 36 is engaged with the output gear 38 which is mounted on the output spindle 40. Thus, the motor shaft 28 is rotatively coupled to the output spindle 40 on which is mounted a tool holding chuck 42.

Figure 5:
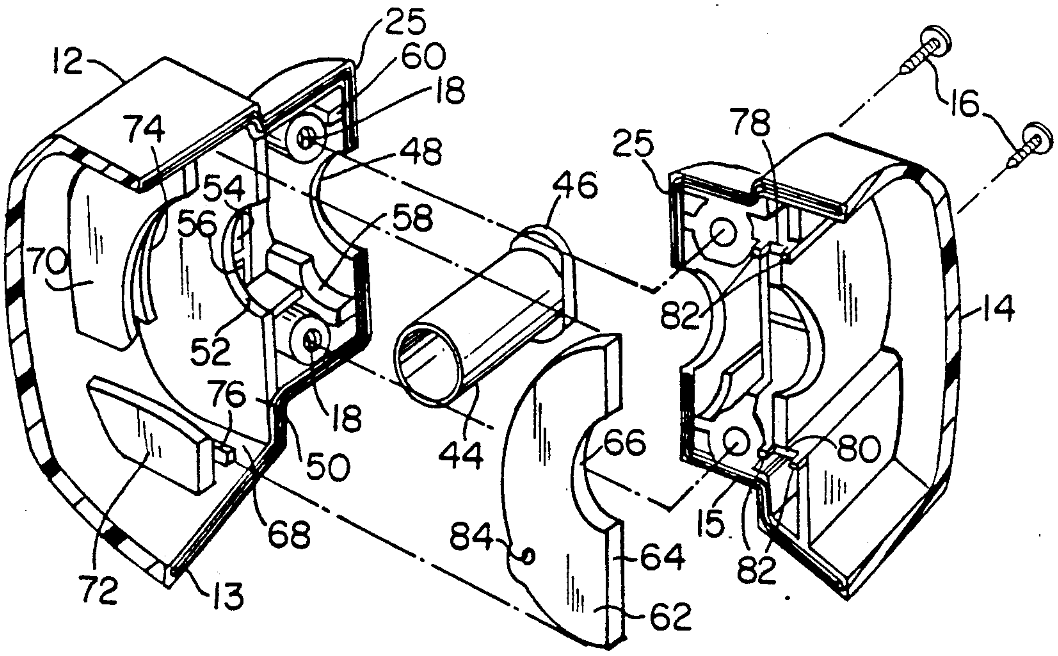
FIG. 5 is an exploded perspective view of the nose end of the two part housing showing the bearing block and spindle bushing according to this invention.

A bushing 44 for the output spindle 40 and having a flatted flange 46 at its forward end is held at the nose end 25 of the housing 12, 14 by appropriately sized and shaped rib structure, best shown in FIG. 5. In addition to the semicircular opening 48 at the nose end 25 of the housing part 12, this structure includes the rib 50 with the semicircular opening 52, as well as the ribs 54, 56. The ribbing 58 and 60 are shaped to hold the flatted flange 46 and prevent the bushing 44 from rotating. Similar structure is present in the other housing part 14.

Figure 3:
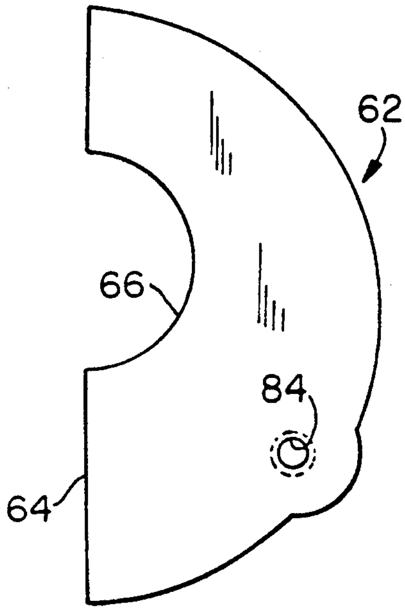
FIG. 3 is a plan view of a bearing block according to this invention.
Figure 4:
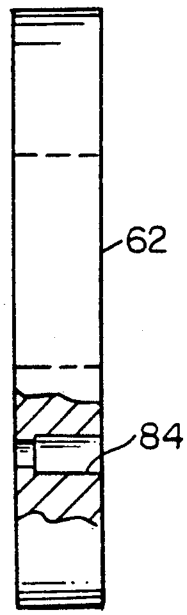
FIG. 4 is a partially sectioned side view of the bearing block of FIG. 3.

In accordance with this invention, a bearing block 62 is provided. As shown in FIG. 3, the bearing block 62 is generally semicircular in plan view and has a flat edge 64. Extending into the body of the bearing block 62 from the flat edge 64 is a semicircular opening 66 which conforms to the exterior surface of the bushing 44. The housing part 12 includes rib structure forming a cavity 68 for containing the bearing block 62. The cavity 68 is open to the plane at which the housing parts 12 and 14 are joined and is defined by the rib 50 on one side and the coplanar ribs 70 and 72 on the other side. The distance between the ribs 70, 72 and the rib 50 is substantially equal to the thickness of the bearing block 62 so that a snug fit of the bearing block 62 within the cavity is attained. The ribs 74 and 76 limit the extent to which the bearing block 62 is inserted into the cavity 68.

Figure 2:
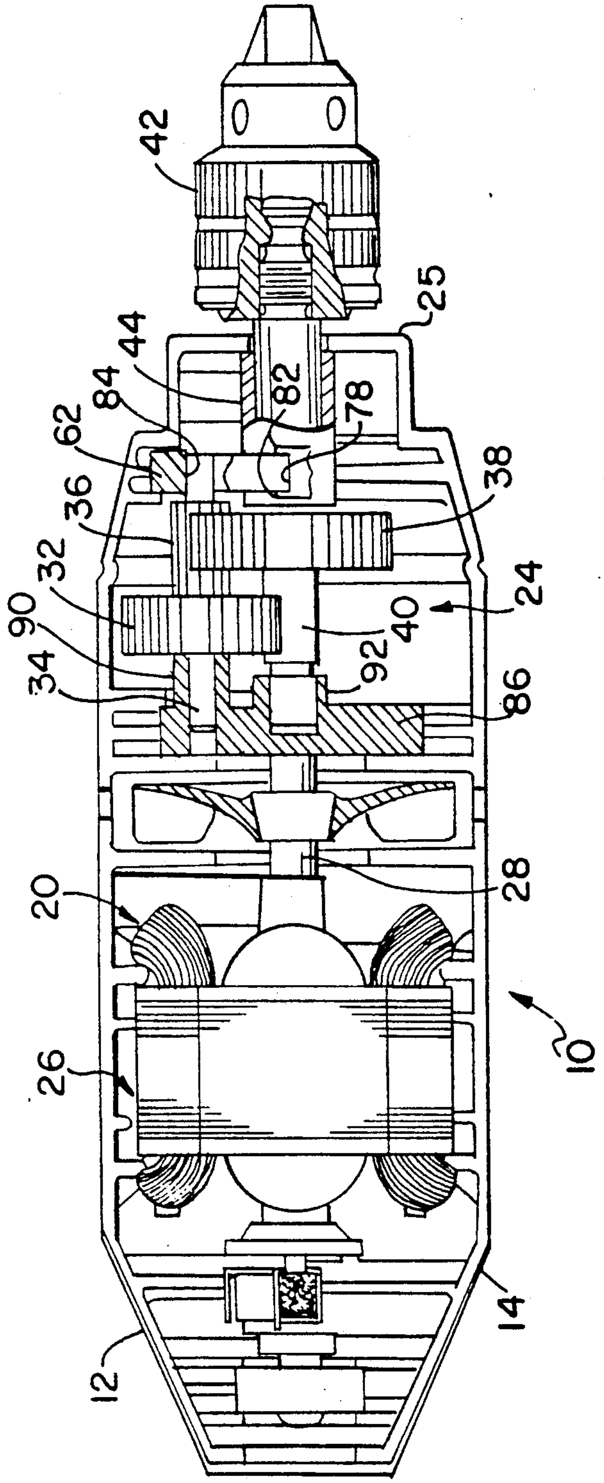
FIG. 2 partially sectioned top view of the drill shown in FIG. 1.

The housing part 14 is formed with structure which is across from the cavity 68 and is adapted to contact the flat edge 64 of the bearing block 62 to initially position and thereafter maintain the bearing block in a predetermined positional alignment within the cavity 68 when the housing parts 12, 14 are joined. This structure includes the rib surfaces 78 and 80 which are substantially aligned with the plane at which the housing parts 12 and 14 are joined. In addition to the surfaces 78, 80, the housing part 14 is formed with projections 82 which extend outwardly from the surfaces 78, 80 and straddle the bearing block 62, as shown in FIG. 2.

The bearing block 62 is further formed with a bore 84 which acts as a bearing in which the intermediate gear shaft 34 is journalled for rotation upon assembly of the drill.

The drill 10 also includes a further bearing block 86, which does not form a part of the present invention. The bearing block 86 holds a bushing 88 for the motor shaft 28 and also includes a forwardly projecting journal section 90 for the intermediate gear shaft 34 and a forwardly projecting journal section 92 for the output spindle 40.

Thus, for assembling the drill 10, the parts are interengaged in the appropriate order and placed in the housing part 12. The housing part 14 is then aligned with the housing part 12 and the screws 16 are tightened to fasten the parts 12, 14 together. As the screws 16 are tightened, the rib surfaces 78, 80 bear against the flat edge 64 of the bearing block 62 to force it fully into the cavity 68 and rotate it about the bushing 44 into proper positional alignment so that the bearing bore 80 for the intermediate gear shaft 34 is lined up with the journal section 90 of the bearing block 86, thereby maintaining the intermediate gear shaft 34 in appropriate alignment with the output spindle 40. This assembly process eliminates the requirement for using a screw clamp and therefore reduces assembly time, as well as eliminating the cost of the screw clamp and two screws.

Accordingly, there has been disclosed a portable power tool with an improved self-aligning bearing block. While an illustrative embodiment of the present invention has been disclosed herein, it will be apparent to those of ordinary skill in the art that various modifications and adaptations to that embodiment are possible and it is only intended that the present invention be limited by the scope of the appended claims.

I claim:

1. A power tool, comprising:

a two part clamshell type housing having a defined nose end, said two housing parts meeting along a plane;

a motor supported within said housing, said motor having a shaft journalled in said housing;

a bushing supported in said housing at said nose end;

an output spindle extending through said bushing and said nose end of said housing;

intermediate gear means including a gear shaft for rotatively coupling said motor shaft to said output spindle;

a bearing block having a surface conforming to an exterior surface of said bushing;

means in said bearing block for providing a bearing support for an end of said gear shaft of said intermediate gear means; and support means for supporting said bearing block with said conforming surface in engagement with said bushing exterior surface, including structure in one of said housing parts forming a cavity to contain said bearing block, said cavity being open along the plane at which said two housing parts meet and structure in the other housing part situated opposite said cavity adapted to contact said bearing block to initially position and thereafter maintain said bearing block in predetermined positional alignment within said cavity when said two housing parts are connected together to form said housing.

2. The tool according to claim wherein said bearing block is generally semicircular in plan view with a flat edge and said conforming surface extends inwardly from said flat edge, said support means supporting said bearing block so that said flat edge is generally aligned with the plane at which said two housing parts meet.

3. The tool according to claim 1 wherein said bushing includes a flatted flange at an end thereof and said housing parts include structure for engaging said flatted flange to prevent rotation of said bushing.

* * * * *